United States Patent [19]

Kuster

[11] 4,322,817
[45] Mar. 30, 1982

[54] SWITCHING REGULATED PULSE WIDTH MODULATED PUSH-PULL CONVERTER

[75] Inventor: Karl H. Kuster, Glendale Heights, Ill.

[73] Assignee: Gte Automatic Electric Labs Inc., Northlake, Ill.

[21] Appl. No.: 220,667

[22] Filed: Dec. 29, 1980

[51] Int. Cl.³ .......................................... H02M 3/335
[52] U.S. Cl. ........................................ 363/26; 363/41; 363/80; 363/85
[58] Field of Search ................................ 363/24–26, 363/41, 79, 80, 97

[56] References Cited

U.S. PATENT DOCUMENTS

| | | | |
|---|---|---|---|
| 3,701,937 | 10/1972 | Combs | 363/25 |
| 3,938,023 | 2/1976 | Hutchinson | 363/25 |
| 4,150,424 | 4/1979 | Nuechterlein | 363/26 |
| 4,266,268 | 5/1981 | Tkacenko | 363/97 X |

Primary Examiner—William M. Shoop
Attorney, Agent, or Firm—Robert J. Black; Gregory G. Hendricks

[57] ABSTRACT

A switching regulated push pull converter which includes voltage and current feedback loops to provide a highly regulated output voltage throughout a 100 percent load range. This circuit also provides a semi-regulated auxiliary output voltage which can be loaded beyond 100 percent of its load range with no minimum load requirement on the highly regulated output voltage. A direct current drive circuit for the push-pull power switches provides a transformerless proportional drive and means are provided to compensate for transformer asymmetry.

13 Claims, 5 Drawing Figures

SWITCHING REGULATED PULSE WIDTH MODULATED PUSH-PULL CONVERTER

BACKGROUND OF THE INVENTION (1) Field of the Invention

The present invention relates to regulated power supplies and more particularly to a switching regulated, pulse width modulated, push-pull converter.

(2) Description of the Prior Art

Current state-of-the-art switching regulated, push-pull converter circuits have good reliability, stability and performance. However, to achieve these characteristics such converters must meet the following criteria: (1) provide symmetrical primary volt-second balance to keep the transformer of the converter operating in the center of its linear region, (2) prevent overlap of the switching intervals during which both switching transistors are operating, and (3) prevent each switching transistor from switching excessive current levels due to an output voltage overload or a voltage spike on the input voltage source.

The typical prior art methods of solving these problems are to include a current sensing means in the output circuit to respond to overload conditions.

Overlap is usually prevented through the use of a transformer proportional drive circuit where their switching transistors are prevented from going into deep saturation keeping storage and fall times to within limits of set guard bands, all at the expense of high DC transistor losses.

Primary volt-second balance schemes range from sensing out feedback of transformer flux to providing always matched pairs of time equal drive pulses.

Accordingly, it is an object of the present invention to provide symmetrical primary volt-second balance, prevent transistor switching overlap and protect the switching transistors from excessive current demands without sacrificing DC losses or high saturation voltages.

Another problem with prior art multiple output converters is the primary load requirement for the converters. These circuits all require a minimum load on the primary output before the auxiliary output can function.

Accordingly it is a further object of the present invention to solve the minimum load dilemma of multiple output switching converters.

SUMMARY OF THE INVENTION

The present invention is a switching regulated, push-pull converter circuit which provides good reliability, stability and performance without the cost of high DC loses or high saturation voltages. This circuit minimizes DC loses through matching of transistor storage times rather than minimizing such storage times by preventing the switching transistors from going into saturation. Transistor switching losses are minimized through use of a transformerless proportional drive circuit. This circuit also overcomes the minimum load dilemma problem of multiple output switching converters through a unique connection arrangement of the multiple outputs.

The circuit of the present invention consists of two power transistor switches connected in a push-pull arrangement. These switches power multiple output circuits via a transformer. A pulse width modulator controls the switching times of the power transistor switches via a porportional drive circuit. Reliability, stability and high performance are provided by this circuit through use of both a current feedback control loop and a voltage feedback control loop. Both of these loops are active when the total load on all outputs is approximately 75 percent to 105 percent of full load. Below the 75 percent load level only the voltage feedback control loop is active while above the 105 percent load level only the current feedback control loop is active.

The unique connection arrangement of the output circuits allows either of the two outputs to be loaded from 0 to 100 percent with no minimum load requirements on the other output.

DESCRIPTION OF THE PREFERRED EMBODIMENT

Figure 1:
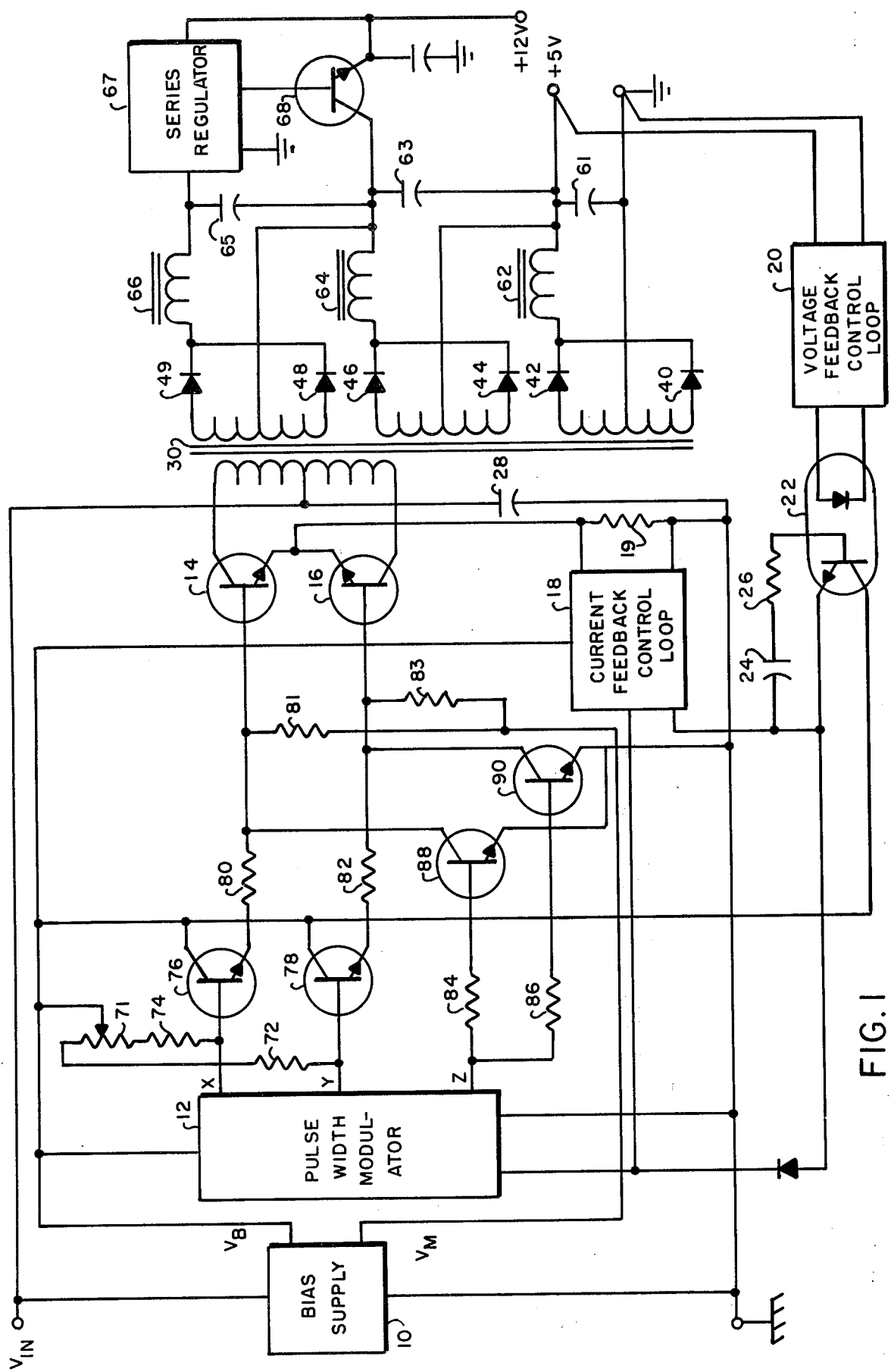
FIG. 1 is a combination schematic and block diagram of a switching regulated pulse width modulated push-pull converter in accordance with the present invention.

Referring now to FIG. 1 the switching regulated, pulse width modulated, push-pull converter of the present invention is shown. Bias supply 10 is shown connected to pulse width modulator 12. Drive transistors 76 and 78 are shown connected between pulse width modulator 12 and switching transistors 14 and 16 which are connected to the primary winding of transformer 30. Pulse width modulator 12 is also shown connected to shunt transistors 88 and 90, current feedback control loop 18 and voltage feedback control loop 20.

The primary winding of transformer 30 is shown connected to switching transistors 14 and 16 while its secondary windings are connected to three output circuits. The first output circuit includes swinging choke 62 connected between filter capacitor 61 and relative diodes 40 and 42. This circuit provides a 5 volt output. The second output circuit includes linear choke 64 connected between filter capacitor 63 and rectifying diodes 44 and 46. The third output circuit includes linear choke 66 connected between filter capacitor 65 and rectifying diodes 48 and 49. These second and third output circuits are connected to series regulator 67 and output transistor 68 all of which combine to provide a 12 volt tightly regulated output.

Figure 5:
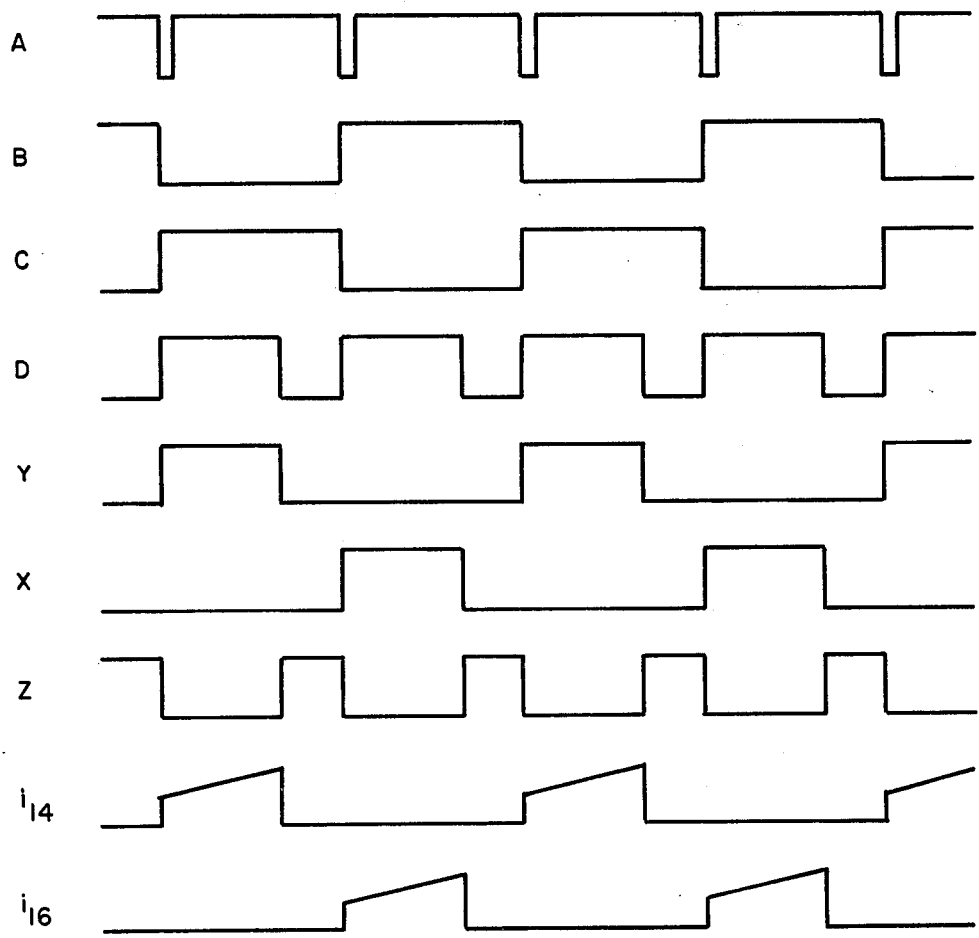
FIG. 5 is a timing diagram in accordance with the present invention.

Pulse width modulator 12 operates to generate alternating pulse trains X and Y which are shown in FIG. 5. Drive transistors 76 and 78 turn on in response to their associated X and Y pulse trains respectively. Consequently switching transistors 14 and 16 are also turned on and off in response to these pulse trains. Switching transistors 14 and 16 thus operate in a push-pull manner and cause transformer 30 to generate a pulse train having a frequency equal to the combination of the pulse trains generated by transistors 14 and 16. The first output circuit rectifies this pulse train and applies the resultant signal to swinging choke 62. This choke presents a high inductance during low current conditions and a low inductance during high current conditions and thus provides greater stability at low loads. The resultant output level from this output circuit is a 5 volt output. Rectifiers 44 and 46 and linear choke 64 operate in a similar manner to provide a 13 volt signal at the collector lead of transistor 68. This higher voltage is obtained through a higher transformer turns ratio. Rectifiers 48 and 49 and linear choke 66 also operate in response to the signal generated by transistors 14 and 16 to generate a voltage signal which is used to drive the series regulator 67 and applied to the base of transistor 68. This transistor generates the resultant 12 volt tightly regulated output.

These output circuits are connected together in a unique stacking arrangement which allows for multiple outputs even under no load conditions on the other output. The prior art methods were unable to achieve this since without this stacking arrangement their output transformer generated narrow pulses under no load conditions on the primary output and was thus unable to provide the required power to the auxiliary output. The stacking arrangement of the present invention overcomes this problem by connecting the outputs together (i.e. capacitor 63 is connected to capacitor 61 and 65) thus allowing part of the load current of the auxiliary output to be supplied by the primary object. Thus current flows in the primary output even if the load is only on the auxiliary output and consequently switching transistors 14 and 16 generate sufficiently wide pulses to power the auxiliary output.

The power transistor current pulses $i_{14}$ and $i_{16}$ shown in FIG. 5 are at their minimum time interval and amplitude when neither of the two outputs has any load applied. During this loading condition swinging choke 62 keeps the amplitude of the current pulses to a minimum and the time interval as long as practical possible. Swinging choke 62 and the stacking arrangement of the auxiliary output circuit make it possible to load the semi-regulated auxiliary 13 V output to 100% with no minimum load requirement on the primary output. The auxiliary output, through the stacking arrangement, provides the minimum load requirement on the primary output. The limiting factors of this stacking arrangement are the voltage ratio of the semi-regulated output to the closed-loop output (13 V/5 V), and the swing ratio of choke 62.

The semi-regulated 13 volt output is converted into a tightly regulated 12 volt output through the use of a highly efficient series regulator 67, 68. The series regulator efficiency is very good because the voltage source of the high-current path is only approximately one volt above the tightly regulated output as full load, while the regulator driving the high-current power transistor is biased by a higher voltage derived by yet another output stacked on top the other two outputs.

To provide reliability, stability and high performance the transistor storage and fall times associated with transistors 14 and 16 must be small. Shunt transistors 88 and 90 operate to provide the required reduction in storage and fall time of transistors 14 and 16. These transistors operate in response to the pulses shown in waveform Z of FIG. 5. This waveform shows a pulse occurring during an absence of pulses in both waveforms X and Y. Thus transistors 88 and 90 are turned on when transistors 76 and 78 are turned off. Consequently transistors 88 and 90 provide a shunt to the bases of switching transistors 14 and 16 thereby allowing for rapid discharge of base current and the resultant elimination or significant reduction of the storage and fall times of switching transistors 14 and 16.

Both current feedback control loop 18 and voltage feedback control loop 20 are active during approximately 75% to 105% of the load range. Loads over 105% pull the 5 volt output out of voltage regulation (current limiting), causing voltage feedback control loop 20 to become inactive, and give all control to current feedback control loop 18. Loads below approximately 75% of full load cause current feedback control loop 18 to become inactive leaving its reference to hover around approximately 75% load. With the current feedback control loops's reference set for only 75% load by the voltage feedback control loop, it is more ready to be called upon during a sudden overload or short circuit on the output or during a noise spike or sudden excursion on the input voltage source.

A noise spike on the input voltage source or a sudden load step change while either transistor switch 14 or switch 16 is conducting introduces a transformer magnetizing current unbalance. Current feedback control loop 18 automatically causes the transistor switch timing intervals to cancel the unbalance if the loading is within the 75%, and over load range. The transient on the input voltage source does not have to propagate all the way to the output before it is compensated for by voltage feedback control loop 20. Current feedback control loop 18 responds very quickly (with ½ to 1 period of the switching frequency) to transients on the input voltage source and also to large load current pulses. This is long before voltage feedback control loop 20 can respond. Loads over 105% of full load transfer all control to current feedback control loop 18 and shift voltage feedback control loop 20 far outside of its operating region. When the load is suddenly reduced to below 105% then the output voltage overshoot transient is minimized since both feedback control loops become active simultaneously.

The action of current feedback control loop 18 protects power transistors 14–16 when the loads are short-circuited and it improves the symmetry of the power transistor currents at high level by reducing the conduction time of the most heavily loaded power transistor. The inherent symmetry correction action of current feedback control loop 18 is extended to lower power transistor current levels by making the reference of the current feedback control loop 18 variable. The reference is adjusted by the voltage feedback control loop 20.

However, the inherent symmetry correction action of current feedback control loop 18 is limited by the imbalance in power transistor switches 14, 16, transformer 30, or rectifier pairs 40, 42, 44, 46, 48. Current feedback control loop 18 commands power transistor switches 14, 16 to turn off when it detects a designated amplitude, but how long thereafter (stroage time) or how fast (fall time) the power switches terminate the current pulses once the command is given is not controlled by current feedback control loop 18.

Potentiometer 71 provides a means to minimize the imbalance in all these components as a whole. Potentiometer 71 adjusts the power transistor switch with the highest current pulses to be driven a little less hard, and the power transistor switch with the lowest current pulses to be driven a little harder, while equal conduction time interval commands are given to the two power switches, thereby making the current pulses agree more with the command signal rather than being a product of the component imbalance. Each power transistor switch is driven to the same relative level of saturation and with the small amount of negative feedback offered by resistor 19, the drive circuit behaves like a proportional drive circuit with improved dc loss characteristics.

Non-linear pulse width modulator 12 aids in the stability, under light loading, because of an inherrent time delay phenomena. Under light loading, a small control current change into pulse width modulator 12 (FIG. 1) has approximately 100 times less effect on the pulse width than the same small control current change has on the pulse width while the power supply is heavily loaded. This non-linear transfer characteristic of pulse width modulator 12, together with optical coupler 22 and the RC network 24-26 provide damping inversely proportional to loading, making the power supply more stable under light loading.

Figure 2:
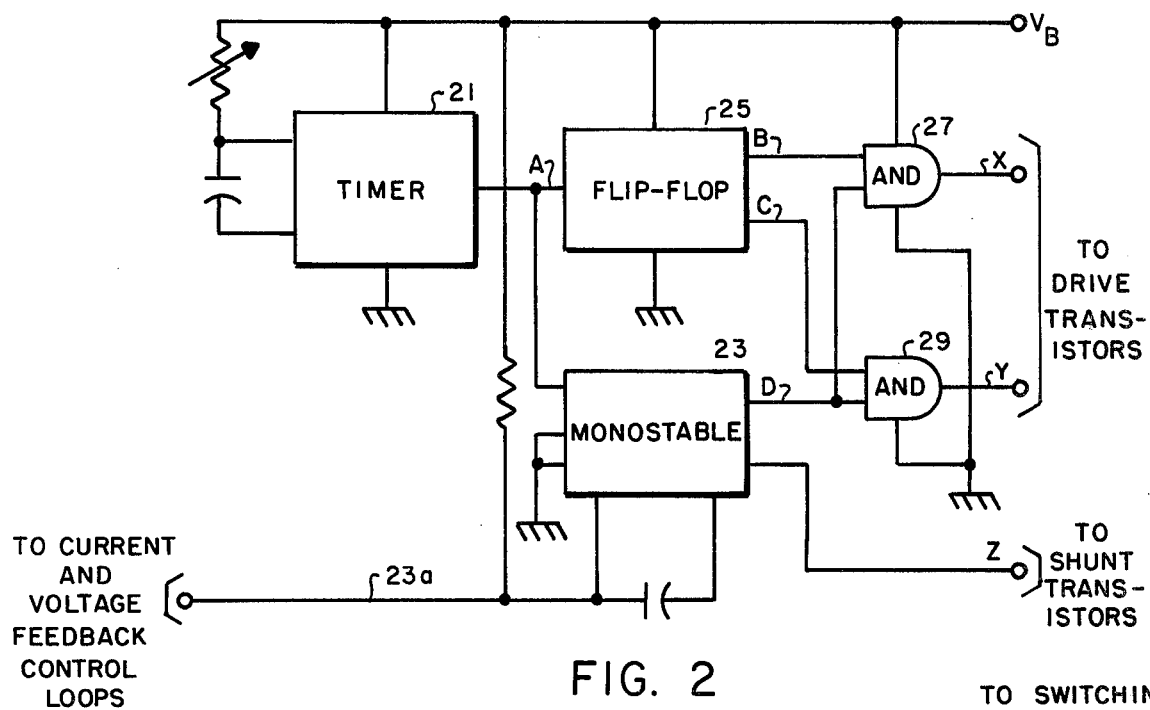
FIG. 2 is a schematic diagram of the pulse width modulator shown in FIG. 1.

Referring now to FIG. 2 pulse width modulator 12 of FIG. 1 is shown. Timer 21 is shown connected to bias supply VB. Timer 21 operates to generate timing pulses as depicted by waveform A of FIG. 5. These pulses have a period equal to one-half the period of the power supply and a pulse width of 96±1% of the timer period. Flip-flop 25 and monostable multivibrator 23 are shown connected to timer 21. Flip-flop 25 operates in response to the timing pulses of waveform A to alternatively generate two pulse trains as depicted by waveforms B and C wherein the output waveforms B and C are the inverse of each other. Monostable multivibrator 23 operates in response to the pulses of waveform A to generate a time variable pulse train as shown in waveform D. The width of these pulses depends on the control current from the voltage and current feedback control loops. Multivibrator 23 also has latching outputs which prevent double pulses from occurring if there is an AC component on the control current from the feedback loops. The pulse trains shown in waveforms B and C provide alternate enable signals to AND gates 27 and 29. Thus gate 27 is enabled when the pulse represented by waveform B is true and AND gate 29 is enabled when the pulses represented by waveform C is true. Consequently AND gates 27 and 29 are alternately enabled and they alternately gate the pulses of waveform D to provide alternately occurring waveforms X and Y which vary in time depending on the needs of power transistor switches 14 and 16. These alternately occurring pulse trains prevent transistors 14 and 16 from being turned on at the same time. Monostable multivibrator 23 generates its variable pulse train as represented by waveform D in response to pulse train A but also under control of voltage and feedback control loops 20 and 18 respectively via lead 23A. Thus current and voltage feedback control loops 18 and 20 can vary the reference voltage for monostable multivibrator 23 and thereby vary the pulse width to waveform D. The pulse width is varied in this manner to lower or raise the output current in accordance with output circuit demands for current.

Figure 3:
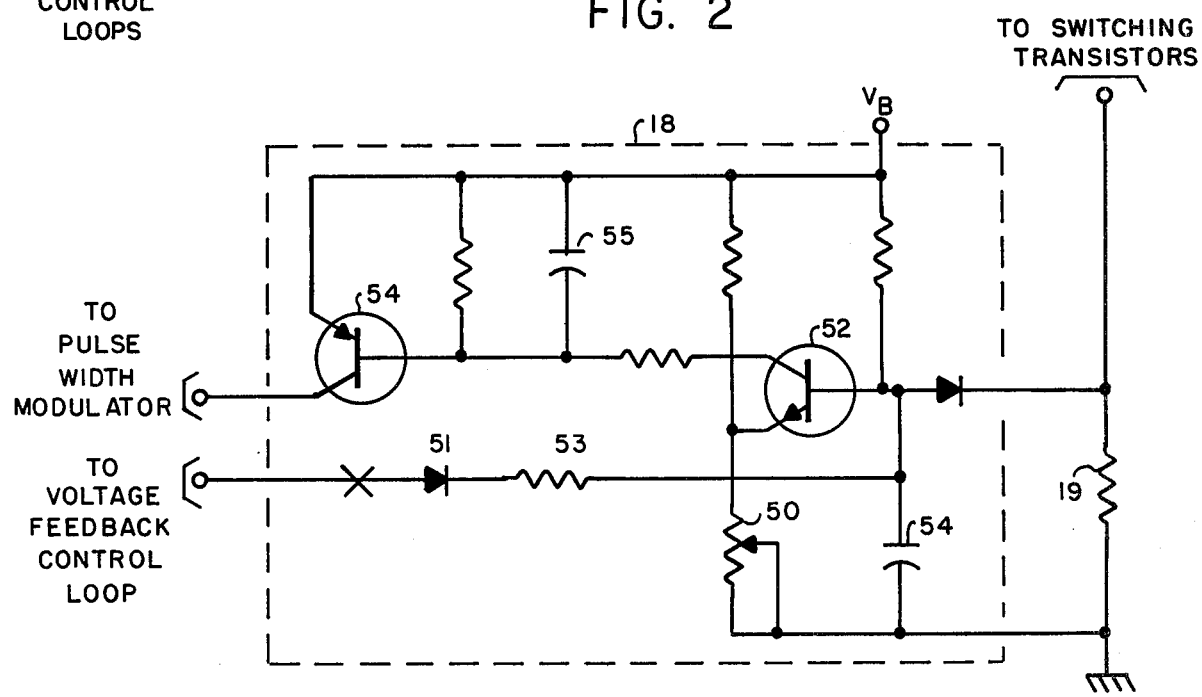
FIG. 3 is a schematic diagram of the current feedback control loop shown in FIG. 1.

Referring now to FIG. 3 the current feedback control loop of FIG. 1 is shown. Bias resistor 19 operates in response to current gated by switching transistors 14 and 16 to develop a bias voltage (typically multivolts) at the base of transistor 52. When this voltage is greater than the reference voltage across potentiometer 50 transistor 52 conducts and applies base current to transistor 54 which amplifies this signal into a control for the pulse width modulator. The base of transistor 52 is also connected to the voltage feedback control loop via diode 51. Therefore, when diode 51 is forward biased the resultant current flow turns on transistor 52 at a lower reference voltage since this additional current will also develop voltage across bias resistor 19. Thus the voltage feedback control loop controls the reference voltage for transistor 52 thereby determining the sensitivity of this transistor to the voltage developed across resistor 19. Capacitors 54-55 guard against noise since the signal to noise ratio is sometimes less than unity.

Figure 4:
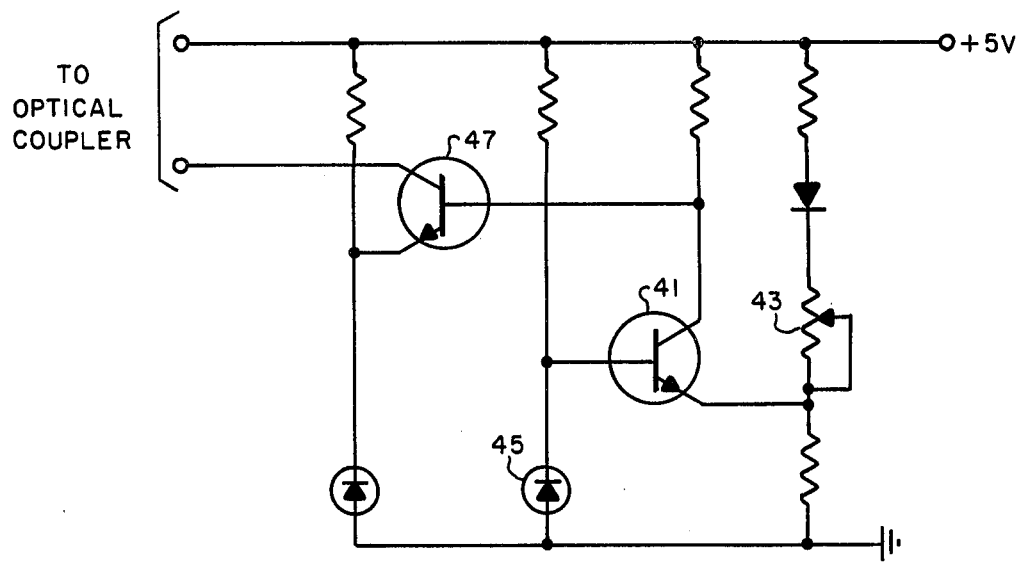
FIG. 4 is a schematic diagram of the voltage feedback control loop shown is FIG. 1.

Referring now to FIG. 4 the voltage feedback control loop of FIG. 1 is shown. The emitter lead of transistor 41 is shown connected to potentiometer 43 and the base of this transistor is connected to reference zener diode 45. Potentiometer 43 provides a variable sampling means for transistor 41. When the voltage developed across this potentiometer goes above the reference voltage of zener diode 45 transistor 41 is turned off. Since the collector of transistor 41 is connected to the base of transistor 47 transistor 47 turns on in response to transistor 41 being turned off. When transistor 47 turns on it generates a control signal to the pulse width modulator thereby causing the pulse with modulator to adjust the width of the pulses it generates and consequently lowers the current output of the switching transistors. This control signal is isolated from the pulse width modulator by photo transistor 22 and filtered by RC network 24 and 26 as shown in FIG. 1.

The series regulator of FIG. 1 provides a regulated 12 volt output. Such regulators are old and well known and a typical example is Automatic Electric's LZ-AEL-561-4258.

The switching regulated pulse width modulated push-pull converter of the present invention thus provides stability, reliability and high performance through use of a pulse width modulator, a transformerless proportional drive circuit, shunt transistors connected to the base of the switching transistors, current and voltage feedback control loops, and a stacking arrangement in the output circuit. The voltage control loop operates for loads up to 75 percent while the current feedback control loop operates for loads of 105 percent or more of the rated load current. Both control loops however operate in the range of 75 to 105 percent of rated load. The stacking arrangement of this invention overcomes the no load dilemma and thus provides auxiliary outputs without the requirement of a minimum load on the primary output.

It will be obvious to those skilled in the art that numerous modifications of the present invention can be made without departing from the spirit of the invention which shall be limited only by the scope of the claims appended hereto.

What is claimed is:

1. A direct current to direct current converter for use in a power supply system including a direct current voltage source, said converter comprising:
   a push-pull amplifier connected to said voltage source, operated to generate periodic primary pulses;
   a transformer connected to said push-pull amplifier operated in response to said primary pulses to generate first, second and third groups of periodically occurring output pulses;
   a first output circuit connected to said transformer, operated to filter said first group of output pulses into a first direct-current voltage output; and a second output circuit comprising first filter means connected to said transformer, second filter means connected to said transformer and said first filter means, a series regulator connected to said second filter means and an output transistor connected to said series regulator and said first filter means, said first filter means operated in response to said second group of output pulses to supply collector current to said output transistor, said second filter means operated to filter said third output pulses and said series regulator operated in response to said filtered third group of output pulses to regulate base current of said output transistor; said output transistor operated in response to said regulated base current and said filtered collector current to generate a second direct current voltage output.

2. A converter as claimed in claim 1, wherein said second output circuit is connected to said first output circuit, whereby said second output circuit is operable to draw power from said first output circuit.

3. A converter circuit as claimed in claim 1, wherein said first and second filter means comprise a choke connected between a pair of rectifying diodes and a capacitor.

4. A converter as claimed in claim 1, wherein there is further included: a voltage feedback control loop connected between said first output circuit and said push-pull amplifier, said voltage feedback control loop operated in response to output current above a predetermined threshold to generate a first control signal, said amplifier operated in response to said first control signal to reduce the width of said primary pulses.

5. A converter as claimed in claim 4, wherein said voltage feedback control loop inhibits said first control signal in response to said first output voltage being below a predetermined threshold.

6. A converter as claimed in claim 4, wherein there is further included: an optical coupler connected between said amplifier and said voltage feedback control loop.

7. A converter as claimed in claim 1, wherein said amplifier comprises:
a pulse width modulator operated to generate alternately occurring first and second switching pulse trains;
a drive circuit connected to said pulse width modulator operated to amplify said first and second switching pulse trains; and
a pair of switching transistors connected in a push-pull arrangement, operated in response to said first and second amplified pulse trains to generate said primary pulses.

8. A converter as claimed in claim 7, wherein said pulse width modulator is further operated to generate shunt control pulses during the absence of said switching pulses, said amplifier further comprising: a pair of shunt transistors connected to the base leads of said switching transistors operated in response to said shunt pulses to shunt base current from said switching transistors.

9. A converter as claimed in claim 7, wherein said amplifier further includes: a variable resistor connected to said drive circuit, operated to equalize the current drawn by said switching transistors.

10. A converter as claimed in claim 1, wherein there is further included: a current feedback control loop connected to said amplifier operated in response to said primary pulses having an amplitude above a predetermined threshold to generate a second control signal, said amplifier operated in response to said second control signal to reduce the width of said primary pulses.

11. A converter as claimed in claim 10, wherein there is further included: a voltage feedback control loop connected between said first output circuit and said push-pull amplifier, operated in response to output current above a predetermined threshold to generate a first control signal;
said threshold of said current feedback control loop is variable, the level of said threshold determined in response to said first control signal.

12. A converter as claimed in claim 7, wherein said pulse width modulator comprises: a timer operated to generate periodic timing pulses;
a flip-flop connected to said timer, operated in response to said timing pulses to generate first and second alternately occurring gating pulse trains;
a monostable multivibrator, connected to said timer operated to generate a variable width pulse train; and gating means connected to said flip-flop and said monostable multivibrator operated in response to said alternately occurring gating pulses and said variable width pulse train to generate said periodic primary pulses.

13. A converter as claimed in claim 12, wherein there is further included: a voltage feedback control loop connected between said first output circuit and said push-pull amplifier, operated in response to output current above a predetermined threshold to generate a first control signal;
a current feedback control loop connected to said amplifier operated in response to said primary pulses having an amplitude above a predetermined threshold to generate a second control signal;
said monostable multivibrator is further operated in response to said first or second control signals to vary the width of said variable width pulse train.

* * * * *